United States Patent
Clothier et al.

(10) Patent No.: US 7,800,073 B2
(45) Date of Patent: Sep. 21, 2010

(54) MOLDABLE NEUTRON SENSITIVE COMPOSITIONS, ARTICLES, AND METHODS

(75) Inventors: Brent Allen Clothier, Niskayuna, NY (US); Venkat Subramaniam Venkataramani, Clifton Park, NY (US); Sergio Paulo Martins Loureiro, Saratoga Springs, NY (US); Adrian Ivan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 302 days.

(21) Appl. No.: 11/949,423

(22) Filed: Dec. 3, 2007

(65) Prior Publication Data

US 2009/0140158 A1    Jun. 4, 2009

(51) Int. Cl.
    G01T 3/00    (2006.01)
(52) U.S. Cl. .................. 250/390.01; 250/370.11; 250/390.11; 252/478
(58) Field of Classification Search ............ 250/390.11, 250/370.11, 390.01; 252/478
See application file for complete search history.

(56) References Cited

U.S. PATENT DOCUMENTS

| | | | |
|---|---|---|---|
| 6,517,743 B2 * | 2/2003 | Anayama et al. ............ 252/478 |
| 6,563,120 B1 | 5/2003 | Baldwin et al. | |
| 6,909,098 B2 | 6/2005 | Bross et al. | |
| 7,067,079 B2 | 6/2006 | Bross et al. | |
| 7,105,832 B2 * | 9/2006 | Dai et al. ................ 250/390.11 |
| 7,145,149 B2 | 12/2006 | Cooke et al. | |
| 2004/0104347 A1 * | 6/2004 | Bross et al. ................ 250/367 |
| 2005/0023479 A1 * | 2/2005 | Grodzins ............... 250/390.11 |
| 2005/0135535 A1 | 6/2005 | Wallace | |
| 2005/0157833 A1 * | 7/2005 | Ishihara et al. ............. 376/272 |
| 2006/0054863 A1 | 3/2006 | Dai et al. | |
| 2007/0029493 A1 | 2/2007 | Kniss et al. | |

OTHER PUBLICATIONS

McKnight, T.K. "An Improved Flexible Neutron Detector for Powder Diffraction Experiments". Thesis submitted to Brigham Young University, Department of Physics and Astronomy, Aug. 2005.

Mukhopadhyay, Sanjoy. "Plastic gamma sensors: an application in search of radioisotopes" in "Hard X-Ray and Gamma-Ray Detector Physics V." Proceedings of the SPIE, vol. 5198, pp. 62-72 (Jan. 2004).

Hutchison, D.P., et al. "Neutron scintillators using wavelength shifting fibers", Report No. CONF-9506185-1, presented at New tools for neutron instrumentation workshop, Les Houches (France), Jun. 6-10, 1995 (available from NTIS as OSTI identifier DE95012841).

Stephan, A.C., et al. "Modelling of composite neutron scintillators", Radiation Protection Dosimetry, vol. 116, No. 1-4, pp. 165-169 (2005).

(Continued)

*Primary Examiner*—David P Porta
*Assistant Examiner*—Jessica L Eley
(74) *Attorney, Agent, or Firm*—GE Global Paten Operation; Peter T. DiMauro (57) ABSTRACT

Moldable neutron sensitive compositions containing an inorganic scintillating component, and neutron capture component, and a moldable resin component, are described. They are prepared with optimized compositions for maximized thermal neutron sensitivity. Methods for preparing such compositions, and articles and radiation detectors made from them are described as well.

36 Claims, 2 Drawing Sheets

OTHER PUBLICATIONS

Thomas, P. "Production of sensitive converter screens for thermal neutron diffraction patterns". J. Applied Crystallography, vol. 5, pp. 373-374 (1972).

Stedman, R. "Scintillator for Thermal Neutrons using Li6F and ZnS(Ag)". Rev. Sci. Instrum. vol. 30, p. 1156 (1960).

Kojima M.K., et al., "Neutron scintillators with high detection efficiency". Nucl. Instrum. Methods A., vol. 529, pp. 325-328 (2004).

Tojo, T., et al. "Preparation of Thermal Neutron Scintillators Based on a Mixture of ZnS (Ag), 6LiF and Polyethylene". Nucl. Instrum. Methods, vol. 53, pp. 163-166 (1967).

* cited by examiner

MOLDABLE NEUTRON SENSITIVE COMPOSITIONS, ARTICLES, AND METHODS

FEDERAL RESEARCH STATEMENT

This invention was made with government support under contract number N66001-05-D-6012 awarded by the Department of Homeland Security. The government has certain rights in the invention.

BACKGROUND

In view of current enhanced interest in the prevention of terrorist activity, there is a need for practical and sensitive neutron radiation detectors which can detect fissile materials and other sources of neutron radiation. Towards this end, there is a high demand for hand-held or portable devices including for example, Hand Held Radioisotope Identification Devices (HHRIID's) with additional neutron detection capability. Standards have in fact been adopted (e.g., ANSI N42.34) to meet current performance demands.

A desirable radiation detector able to detect neutron radiation should demonstrate improved functionality and identification performance; it should be able to be easily deployable, and have low total cost of ownership. Currently used neutron detectors include gas proportional counters as well as liquid scintillators. Gas proportional counters commonly utilize a gaseous composition, such as helium-3 (a He isotope) or a boron-10 (a B isotope) containing gas, e.g., $^{10}BF_3$. In order to achieve a suitable neutron detection sensitivity, a large number of neutron capture nuclides is needed; due to the very low atomic density presented by the gases, a relatively large containment area and high pressures can thus be required to house the large volume occupied by the gaseous composition. The manufacturing and ownership costs of such large gas pressurized detectors can be extremely high. Further, pressurized gas containers are subject to Federal code regulations for handling and transport and severely limit the portability of gas proportional counters. Liquid scintillators are sensitive to gamma radiation and also suffer from the drawback of being relatively large in size due to their low density.

Thus, a portable, solid-based neutron radiation detector with high neutron sensitivity, low gamma sensitivity, and small volume is needed to address at least some of the concerns above.

BRIEF SUMMARY OF THE INVENTION

An embodiment of the present disclosure is directed to a moldable, neutron sensitive composition comprising an inorganic scintillating component, a neutron capture component comprising a nuclide having a thermal neutron absorption capture cross-section of at least about 100 barns, and a gamma-ray insensitive, transmissive moldable resin composition, in which the inorganic scintillating component and the neutron capture component are in intimate mixture with at least each other, and in which the moldable, neutron sensitive composition is a solid or semi-solid with sufficient flowability for molding into a shaped article.

Another embodiment of the present disclosure is directed to shaped, neutron sensitive articles made by molding the moldable, neutron sensitive composition of the present disclosure.

Still another embodiment of the present disclosure is directed to a radiation detector capable of neutron detection having a radiation sensing element which comprises shaped, neutron sensitive articles of the present disclosure.

Yet another embodiment of the present disclosure is directed to a method of fabricating a moldable, neutron sensitive composition, this method comprising the steps of forming an intimate mixture of at least one inorganic scintillating component and at least one neutron capture component comprising a nuclide having a thermal neutron absorption capture cross-section of at least about 100 barns; and combining the intimate mixture of the at least one inorganic scintillating component and the at least one neutron capture component with a gamma-ray insensitive, transmissive moldable resin composition under conditions effective to form the moldable, neutron sensitive composition as a solid or semi-solid with sufficient flowability for molding into a shaped article.

Other features, advantages, and embodiments of this disclosure will be better appreciated from the following detailed description.

The following descriptions of various exemplary embodiments are not intended to be, and should not be considered to be, limiting in any way.

DETAILED DESCRIPTION

A typical moldable, neutron sensitive composition according to the present disclosure comprises an inorganic scintillating component, a neutron capture component comprising a nuclide having a thermal neutron absorption capture cross-section of at least about 100 barns, and a gamma ray-insensitive, transmissive moldable resin composition, in which the inorganic scintillating component and the neutron capture component are in intimate mixture with at least each other, and in which the moldable, neutron sensitive composition is a solid or semi-solid with sufficient flowability for molding into a shaped article. As used herein, "transmissive" means "optically transmissive", and refers to the resin composition having a light transmittivity of at least about 90% at the emission wavelength of the scintillating component. In this disclosure "gamma ray-insensitive" refers to the moldable resin composition having the simultaneous characteristics of being resistant to degradation by gamma radiation, and being substantially not fluorescent in the presence of gamma radiation. In other words, the moldable resin composition per se substantially does not act as a scintillator.

As used herein, an "intimate mixture" of the named components, refers to a homogeneous mixture where crystallites of the inorganic scintillating component are in direct contact with crystallites of the neutron capture component. In general, a composition has "sufficient flowability for molding into a shaped article" if it is capable of being formed into one or more arbitrary shapes selected from layers, sheets, rods, wires, nets, lenticular fixtures, fibers, complex bodies, or coatings, by a shaping step selected from the group consisting of tape casting, slip casting, extrusion, pultrusion, injection molding, compression molding, blow molding, rolling, thermoforming, vacuum forming, kneading, pressing, coating, spraying, printing, and combinations thereof.

Contemplated herein are wide ranges of substances which can be employed as inorganic scintillating component and neutron capture component, respectively. The selection of materials is made according to that which will be optimum for the particular application to which the moldable neutron sensitive composition will be applied. For instance, some preferred embodiments herein employ $^6$Li-enriched LiF in combination with activated ZnS as scintillating component, but the disclosure should by no means be limited thereto.

In some embodiments, the inorganic scintillating component comprises one or more selected from metal oxide, metal sulfide, metal selenide, metal oxysulfide, mixed metal oxide, metal halide, and the like, and mixtures thereof, in pure or doped form. The choice of inorganic scintillating component is not particularly limited from among the foregoing, but in certain embodiments should brightly scintillate upon being impinged by one or more of a proton, an alpha particle, a beta particle, a fission fragment, or a deuterium or tritium nuclide; and in certain embodiments it should also preferably not fluoresce under solely gamma irradiation. By "bright scintillation" or "brightly scintillate" is generally meant a value of at least about 400 photons/MeV, preferably at least about 4000 photons/MeV. Some specific useful materials for the inorganic scintillating component may possibly include one or more of ZnS:Ag; ZnS:Cu; $Y_2O_3$:Eu; $Lu_2SiO_5$:Ce; $Y_2SiO_5$:Ce; ZnO:Ga; $Y_3Al_5O_{12}$:Ce; $CaSiO_3$:Mn,Pb; $La_2O_2S$:Eu; $Gd_2O_2S$:Tb; LaOBr:Tb; CaS:Ce; CdS; (Zn,Cd)S:Ag; Ca(S, Se) doped by Ce or Tb; $CeCl_3$; $BaCl_2$; or the like. Still others can be chosen from those inorganic scintillating materials disclosed in US Patent Publication 20030178574, pertinent sections of which are hereby incorporated by reference. Inorganic scintillating components are in general chosen on the basis of ability to scintillate brightly upon being impinged by one or more of a proton, an alpha particle, a beta particle, a fission fragment, or a deuterium or tritium nuclide. In some embodiments, the inorganic scintillating component comprises a ZnS—CdS alloy (namely, (Zn,Cd)S) or ZnS, both optionally doped with another element such as Ag or Cu. ZnS can be obtained with either Ag or Cu doping which allows its emitted light to range from 450 to 550 nm average output wavelength in order to match different photo-sensors. The form in which the inorganic scintillating component is initially provided (that is, its initial state prior to its being incorporated into the final moldable neutron sensitive composition) is not particularly limited, and may be in dispersed or solid form, and may be provided as a pure form or as a mixture.

Suitable for use as neutron capture components are those element(s) with high neutron capture cross section which are able to generate high-energy particles as a result of the nuclear reaction. As employed herein, a "high" neutron capture cross section refers to a thermal neutron absorption capture cross-section of at least about 100 barns, preferably from about 100 barns to about 100,000 barns or even higher. In certain embodiments it is advantageous that this component be substantially transparent to incoming gamma radiation.

In some embodiments, the neutron capture component comprises a compound of an element selected from B, Li and Gd. In some embodiments, the neutron capture component includes $^{10}$B or $^6$Li. Although the present disclosure is not limited, an exemplified neutron capture component comprises lithium-6 fluoride. It is a stable compound with a high Li content, and is substantially insoluble in water and common organic solvents. The thermal neutron capture cross section for $^6$Li for the (n, α) reaction is about 940 barns, and its neutron capture reaction is as follows:

$^6Li + ^1n \rightarrow ^3H + ^4\alpha + 4.78$ MeV

This direct conversion of captured neutron to charged particles such as alpha particles and tritons is advantageous for applications where it is desired to detect neutron flux independently of the presence of gamma radiation.

It is understood that other neutron capture components, such as compounds of Gd, can be employed within the scope of the disclosure. In cases where compounds of Gd are employed, the $^{157}$Gd nuclide will not ordinarily yield solely high energy particles upon neutron capture, but will also yield gamma-ray photons and conversion electrons of varying energy. In such cases, the inorganic scintillating component should be chosen so as to give bright scintillation upon interaction with gamma photons and conversion electrons of such energy.

In some embodiments, the inorganic scintillating component and the neutron capture component can be the same material or compound, provided such material or compound satisfies the other general requirements of a suitable inorganic scintillating component and neutron capture component.

Although the mean particle size of the inorganic scintillating component and the neutron capture component is not always particularly limited, in one embodiment, each has a mean particle size which is suitable for effective neutron capture and effective scintillation behavior. For example, each can have a mean particle size of from about 0.01 microns to about 100 microns. In a narrower embodiment, each of the inorganic scintillating component and the neutron capture component has a mean particle size of about 0.1 to about 100 microns. In a still narrower embodiment, each of the inorganic scintillating component and the neutron capture component has a mean particle size of about 0.1 microns to about 60 microns.

Without being limited by any theory of operation, one effect of ensuring that the inorganic scintillating component (for example, ZnS:Ag) and the neutron capture component (for example, $^6$LiF) are intimately mixed with each other (and, optionally, also intimately mixed with the moldable resin composition), is to optimize the efficiency of registration of neutrons. Stated differently, the efficiency with which neutron capture by the neutron capture component would lead to scintillation by the inorganic scintillating component, is maximized in systems where the two are intimately mixed with each other. For example, and without being limited by theory, the provision of an intimate mixture of $^6$LiF particles and ZnS:Ag crystallite in a resin component will increase the probability that the triton/alpha particle released upon neutron capture will not lose kinetic energy prior to registration by an scintillating crystallite. Other possible effects which can accompany such an intimate mixture include a lessening of scattering of light emitted by the scintillating component by granular or particulate materials. Other advantages, such as improved thermal neutron sensitivity values, as defined hereinunder, may flow from ensuring that the inorganic scintillating component and the neutron capture component are intimately mixed with each other and, optionally, also intimately mixed with the moldable resin composition.

The moldable resin composition of the present disclosure is preferably characterized by an ability to enable simplified fabrication of shaped articles. As used herein, "shaped articles" includes, but is not limited to: layers, sheets, rods, wires, nets, lenticular fixtures, fibers, etc. (via processes including tape-casting and extrusion); complex bodies, etc. (via processes including machining or casting); and conformal coatings, etc. (via processes including spraying, dipping, or spinning). All of these aforementioned "shaped articles" constitute "articles" according to the present disclosure and claims.

In some embodiments, the moldable resin composition comprises one or more of a thermoplastic resin or a thermoset resin. In some embodiments, the moldable resin composition comprises one or more selected from acrylate-based resin, epoxy resin, siloxane resin, and the like. Where a thermoplastic resin is chosen, it may be selected from the group consisting of polyacetal, polyacrylic, polyamide, polyamideimide, polyanhydride, polyarylate, polyarylsulfone, polybenzimidazole, polybenzothiazinophenothiazine, polybenzothiazole, polybenzoxazole, polycarbonate, polycarborane, polydibenzofuran, polydioxoisoindoline, polyester, polyether etherketone, polyether ketone ketone, polyetherimide, polyetherketone, polyethersulfone, polyimide, polyoxabicyclononane, polyoxadiazole, polyoxindole, polyoxoisoindoline, polyphenylene sulfide, polyphosphazene, polyphthalide, polypiperazine, polypiperidine, polypyrazinoquinoxaline, polypyrazole, polypyridazine, polypyridine, polypyromellitimide, polypyrrolidine, polyquinoxaline, polysilazane, polystyrene, polysulfide, polysulfonamide, polysulfonate, polysulfone, polytetrafluoroethylene, polythioester, polytriazine, polytriazole, polyurea, polyvinyl alcohol, polyvinyl ester, polyvinyl ether, polyvinyl halide, polyvinyl ketone, polyvinyl nitrile, polyvinyl thioether, and combinations comprising one or more of the foregoing thermoplastic resin.

Moldable resin compositions of the present disclosure may also include one or more of any conventional additives, e.g., antioxidants, UV absorbers, stabilizers, metal deactivators, peroxide scavengers, fillers, reinforcing agents, plasticizers, lubricants, emulsifiers, pigments, optical brighteners, flame-proofing agents, anti-static agents, blowing agents, among others. When required or desired, these additives are chosen such that the requisite gamma insensitivity, optical transmission, and moldability are maintained. Moldable resin compositions of the present disclosure may also advantageously substantially not fluoresce under irradiation by gamma rays, and may also advantageously be insensitive to degradation under gamma irradiation.

In certain embodiments, it is preferred to ensure that the chosen moldable resin composition is an optically clear molding composition. Many of these are commercially available for use in optoelectronic applications, and the choice will depend upon the desired gamma ray insensitivity and optical clarity possessed by the material. Some such molding compositions include optically clear epoxy resins, a non-limiting example of which is EPOTEK 301-2, available from Epoxy Technology, Billerica Mass.

The inventors of the present application have found that, in the moldable, neutron sensitive composition of the present disclosure, the mass ratio of neutron capture component to inorganic scintillating component is a result-effective variable parameter. In some embodiments of the present disclosure, the mass ratio (denoted r) of neutron capture component to inorganic scintillating component is from about 0.01 to about 100. In other embodiments, this ratio is from about 0.1 to about 10. In still other embodiments, this ratio is from about 0.2 to about 1. In general, moldable neutron sensitive compositions having a higher mass ratio of neutron capture component to inorganic scintillating component would exhibit higher resultant neutron sensitivity when in use as a sensing layer. As defined herein, "neutron sensitivity" for a neutron sensing article of given cross sectional area is a ratio of the number of light pulses capable of being detected per unit time per unit cross-sectional area of the article (reported as counts per second per $cm^2$), to incident neutron flux which penetrates the article (reported as neutrons per second per $cm^2$). This is a definition of performance of the article in use; the definition would not include photons generated by the scintillating component that are absorbed or scattered by the resin composition such that they cannot be detected. The "number of light pulses capable of being detected" refers to light which is registered by a detector, but generally does not refer to light which is generated that is incapable of escaping the article in a manner such that it can be detected.

The inventors of the present application have also found that the volume fraction ($V_f$) of the sum of volumes of inorganic scintillating component and neutron capture component, relative to the total volume of moldable neutron sensitive composition, can vary in the range of about 10% to about 90%. In other embodiments, this volume fraction can vary in the range of from about 40% to about 80%. Other values are also possible. In general, values of volume fraction which are too high can sometimes be unacceptably viscous, whereas values of volume fraction which are too low can sometimes exhibit pooling or sedimentation of particulate components. The present inventors have discovered that this volume fraction also is an important factor in determining the probability that the capture of a neutron will result in scintillation by the inorganic scintillating component; and also is important in determining the amount of light which is scattered after a given scintillation event.

General methods for fabricating the moldable, neutron sensitive compositions of the present disclosure involve a multi-stage process. In one embodiment, a general method of fabricating a moldable, neutron sensitive composition can include a step of forming an intimate mixture of at least one inorganic scintillating component and at least one neutron capture component comprising a nuclide having a thermal neutron absorption capture cross-section of at least about 100 barns. The intimate mixture can then be combined with a gamma ray-insensitive, transmissive moldable resin composition. This step of combining is performed under conditions effective to form the moldable, neutron sensitive composition as a solid or semi-solid with sufficient flowability for molding into a shaped article. Such conditions can include one or more selected from the group consisting of agitating, filtering, straining, pressing, crushing, deagglomerating, and the like. It is sometimes advantageous to further perform one or more step selected from comminuting, agitating, and deagglomerating upon the at least one inorganic scintillating component and the at least one neutron capture component individually or together during or prior to the step of forming the intimate mixture.

In other embodiments, either of the inorganic scintillating component and the neutron capture component can be first admixed with the transmissive moldable resin composition, followed by the other component. In such embodiment, the resin composition may require preparation prior to use, as explained below. Regardless of the order, the respective components can be independently combined in solid, liquid, or dissolved form. It is often convenient to prepare the mixture of the inorganic scintillating component and the neutron capture component as a combination of granular components. Whichever form of the original components is chosen, the final product must comprise an intimate mixture of the inorganic scintillating component and the neutron capture component with at least each other, and, optionally, also with the moldable resin composition. It will be described in the example hereinunder one means by which such intimate mixture is achieved.

In certain embodiments, the present disclosure may involve the preparation of the transmissive moldable resin composition. In cases where the moldable resin composition is already of sufficient character to confer the desired flowability features to the final composition, it may be used substantially as received. Certain silicone (e.g., polydimethylsiloxane) resins may have sufficient plasticity for this. Alternatively, the resin can be a multipart reaction product which must be prepared prior to use. Certain epoxy resins may require this, as by, for example, combination of a hardener and a resin precursor.

As noted above, the inorganic scintillating component (e.g., ZnS:Ag) and the neutron capture component (e.g., $^6$LiF) must be admixed with the moldable resin composition. In certain embodiments, this requires the admixing of granular components with a resin. In such an embodiment, granular material is added to the resin under effective conditions such as agitating, filtering, straining, pressing, crushing, deagglomerating, and the like. The conditions are effective to achieve or maintain an intimate mixture or dispersion, and to form a moldable, neutron sensitive composition as a solid or semi-solid with sufficient flowability for molding into a shaped article. Any remaining aggregates of granular starting material can be removed or disintegrated by sizing, straining, sieving or otherwise further deagglomerating the mixture. Such a step of deagglomeration can eliminate any entrapped air-bubbles as well as break up aggregates. It is desirable, although not required, to attain a smooth and/or creamy mixture. In some embodiments, a smooth and/or creamy intimate dispersion of the components in the resin offers advantages, possibly including an advantageous reduction in streaking during casting into an article.

For fabrication into a shaped article, a shaping step is required. A wide variety of shaping steps for moldable resin compositions are known to persons skilled in the art. Among the processes by which a moldable, neutron sensitive composition may be shaped into an article includes one or steps such as tape casting, slip casting, extrusion, pultrusion, injection molding, compression molding, blow molding, rolling, thermoforming, vacuum forming, kneading, pressing, coating, spraying, printing, and combinations thereof, and the like. The particular method chosen is not especially critical, but depends upon the desired final shape. In certain embodiments, the composition and/or consistency of the moldable neutron sensitive composition may have an impact upon the choice of parameters by which the shaping step is conducted. For instance, if the solids content of the moldable neutron sensitive composition is too high, the composition may be too viscous for efficient use. On the other hand, if the solids content of the moldable neutron sensitive composition is too low, then sedimentation of the solids could occur.

In some embodiments, the moldable resin composition is capable of being shaped as formed, at substantially ambient conditions. In some embodiments, diluents, thinners, or plasticizers may be added to facilitate shaping. In still other embodiments, conditions of pressure and/or temperature above ambient may be employed to also facilitate or enable shaping.

Regardless of the method chosen, the shaped neutron sensitive article can be in a variety of shapes. In certain embodiments, such article in the form of an elongated layer having a thickness, wherein parameters of thickness, $V_f$, and mass ratio of neutron capture component to inorganic scintillating component of said shaped neutron sensitive article are each preselected to maximize a thermal neutron sensitivity value for the article. As used herein, "$V_f$" is defined to mean the volume fraction of the sum of volumes of inorganic scintillating component and neutron capture component, relative to the total volume of moldable neutron sensitive composition. In other embodiments, the article is in the form of an elongated layer having a thickness of from about 10 to about 10000 microns. In other embodiments, the thickness is in the range of from about 200 to about 2000 microns. In other embodiments, the thickness is in the range of from about 300 to about 800 microns.

Shaped articles according to the present disclosure can be employed as a component of a radiation detector capable of neutron detection. In general, such detector comprises a radiation sensing element including the shaped, neutron sensitive article according to the present disclosure; and a photosensor optically coupled to the shaped, neutron sensitive article for detecting emission of photons from the inorganic scintillating component of the shaped, neutron sensitive article. Such detectors can advantageously be portable or hand-held.

Figure 1:
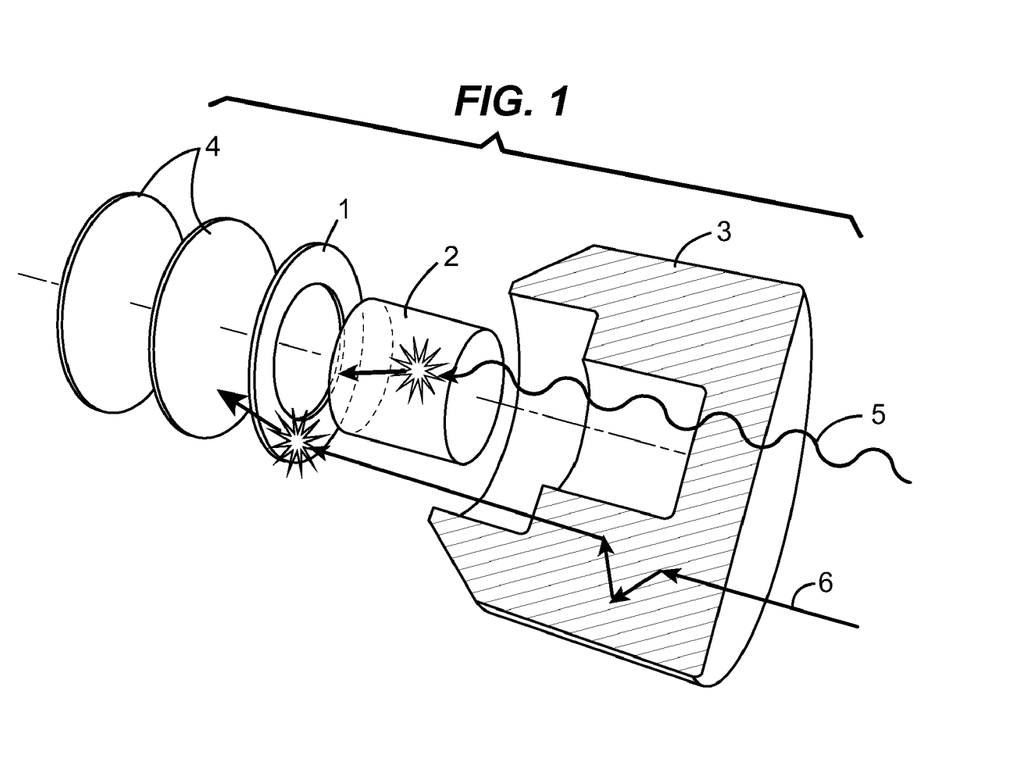
FIG. 1 represents a radiation detector according to embodiments of the disclosure.

An illustrative but nonlimiting schematic embodiment, showing a shaped article in operation, is shown in FIG. 1. In this embodiment, shaped article 1 is employed to detect thermal neutrons in an environment including gamma photons 5 and fast neutrons 6. In this environment, fast neutrons 6 are moderated by thermalizer or moderator 3, which can be a hydrogenous material or any known material capable of converting fast neutrons to thermal neutrons. Article 1 is employed in combination with a gamma detector 2, which, in embodiments, can be a single crystal optimized for scintillation upon impingement with gamma photon 5. In this illustrative embodiment, article 1 is shown as having a ring form, which may surround gamma detector 2 in annular fashion; however, it is understood that the neutron sensitive composition may take the form of an article of many other shapes as well, in other configurations relative to the gamma detector 2. As schematically shown, fast neutrons 6 impinge neutron sensitive shaped article 1 (after thermalization), and scintillation occurs. The respective scintillations from 1 and from 2 are detected by photodetectors or photomultipliers 4 as electrical pulses, which are further electronically resolved as neutron-induced or gamma-induced, based on the characteristics of scintillation light decay in 1 and 2.

EXAMPLE

The example that follows is merely illustrative, and should not be construed to be any sort of limitation on the scope of the claimed invention.

The fabrication of $^6$LiF/ZnS:Ag neutron-sensing layers was accomplished in this exemplary embodiment using a four-stage process: (1) preparation of a $^6$LiF/ZnS:Ag granular mixture, (2) preparation of an EPOTEK 301-2 epoxy resin host, (3) addition of $^6$LiF/ZnS:Ag powder into the EPOTEK 301-2 host; and (4) casting of functionalized epoxy into tapes. A detailed description of each stage is provided below.

To ensure component quality, the $^6$LiF and ZnS:Ag powders were first verified by x-ray diffraction (i.e., phase-purity), photoluminescence (i.e., emission and excitation, ZnS:Ag only), and particle-size analysis (i.e., mean size and distribution). Afterwards, one part by mass $^6$LiF and three parts by mass ZnS:Ag were added individually to 2-propanol to form suspensions, and then each suspension was dispersed via strong agitation. The resulting suspensions were combined, further dispersed under agitation, and decanted to separate the now-combined solids. It is understood that other methods of separating solids, for example, filtering, can be employed. The damp, snow-white cake was dried at 80° C., leaving a loose body. Intimate mixing of the $^6$LiF and ZnS:Ag components was confirmed by electron microscopy. The granular mixture was stored in an air-tight container for subsequent use.

Epoxy resin EPOTEK 301-2 was prepared by mixing hardener and resin in the manufacturer-recommended 0.35:1 mass ratio. The as-mixed epoxy was allowed to stand for 1 hour at room temperature before adding the $^6$LiF/ZnS:Ag granular mixture.

An appropriate amount of $^6$LiF/ZnS:Ag material, as determined by the desired volume percentage, was added to the Epotek 301-2 under stirring. It was important to perform this addition in such a manner that no streaks were formed in the epoxy. The suspension was strained sequentially through two -60 and -100 square nylon meshes (0.250 and 0.150 mm, respectively). This procedure eliminated entrapped air-bubbles and broke up aggregates, leaving a smooth, cream-like fluid. Failure to complete this procedure (i.e., straining through both meshes) resulted in streaks during tape-casting.

Tape-casting was conducted on TEFLON-coated polyester films and the resulting layers allowed to cure for 2 days. Slow casting velocities (about 0.7 cm/s) were required to maintain continuous layers. Functionalized epoxies with high solid loadings (>35% by volume) were unacceptably viscous. In contrast, systems with low solid loadings (<15% by volume) exhibited sedimentation. To circumvent such behavior, these latter suspensions were heated in an oven at 80° C. for 25 minutes. Subsequent cooling to ambient temperature (after initial stirring to redisperse the powder) induced the transition to a suitably viscous fluid (about 7 minutes). Tape-casting was conducted immediately thereafter.

After fabricating the neutron-sensing layers, thin disks were removed from these cured composites via a water jet. Specimens of differing layers were tested under neutron irradiation to investigate the effect of $^6$LiF/ZnS:Ag mass ratio (r), thickness (t) and volume fraction ($V_f$) on neutron sensitivity. The testing was done via exposures (for 200 seconds) to a moderated 6 Curie, $^{239}$Pu-Be neutron source.

Figure 2:
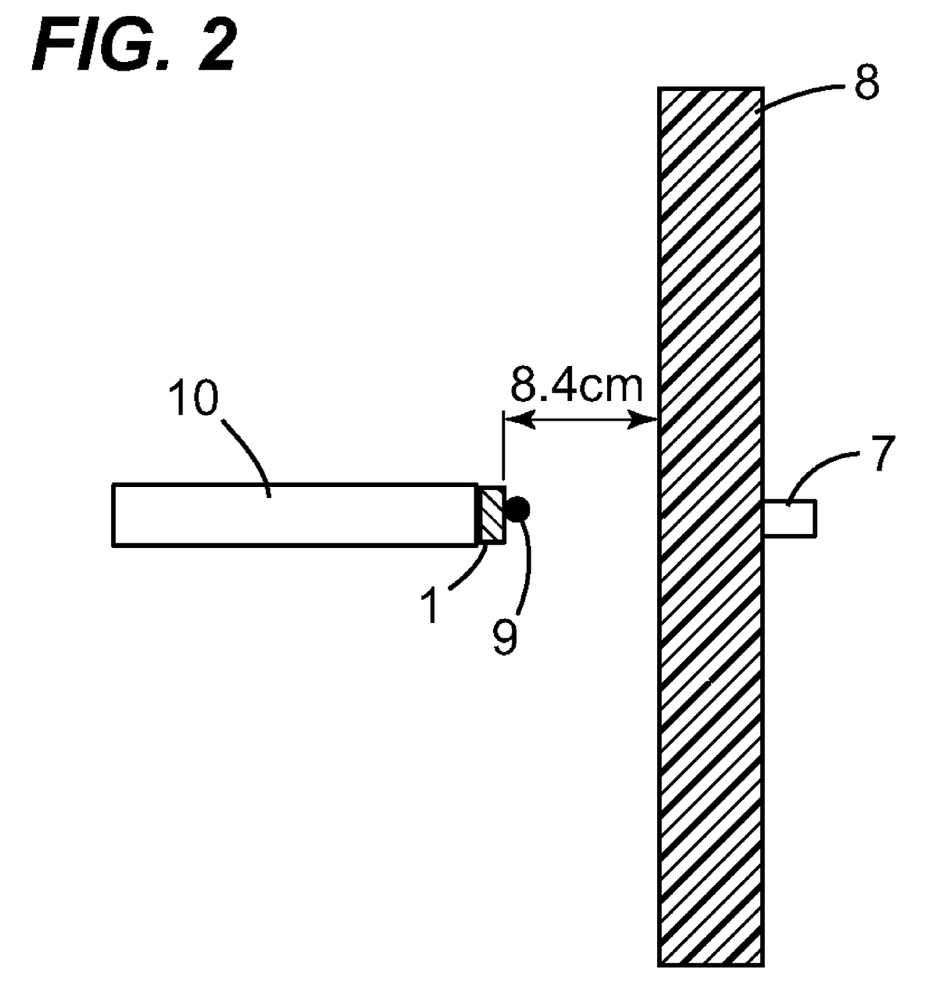
FIG. 2 represents a general schematic illustration for the performance of neutron sensitivity tests.

FIG. 2 represents a general schematic illustration for how such tests were conducted. Here, a shaped neutron sensitive article 1 in layer form according to the present example, was affixed adjacent a photomultiplier 10 for detection of scintillation from 1. A 239Pu-Be fast neutron source 7 was behind a 5.0 cm thick slab of polyethylene moderator 8, in order to slow and thermalize neutrons, represented by impinging thermal neutron 9. The distance from the proximate end of the thermalizer 8 to the shaped neutron sensitive article 1 in layer form, was 8.4 cm.

Table 1 below shows the results of experiments performed with shaped neutron sensitive articles in layer form, of varying thickness (in microns), $V_f$ (expressed as percent), and mass ratio (denoted as r) as previously defined:

TABLE 1

| t (µm) | $V_f$(%) | r | Light Output (Counts/s) | n-sensitivity (%) |
|---|---|---|---|---|
| 111 | 10 | 0.200 | 53.3 | 0.91 |
| 106 | 10 | 1.000 | 55.1 | 0.94 |
| 560 | 10 | 0.200 | 135.5 | 2.31 |
| 639 | 10 | 1.000 | 211.7 | 3.61 |
| 110 | 30 | 0.200 | 235.8 | 4.03 |
| 351 | 20 | 0.333 | 323.4 | 5.52 |
| 102 | 30 | 1.000 | 329.1 | 5.62 |
| 600 | 30 | 0.200 | 508.8 | 8.69 |
| 610 | 30 | 1.000 | 714.3 | 12.20 |

The best performing layer (r=1; t=610 mm; $V_f$=30%) exhibited a neutron sensitivity of 12.2%, performance which easily exceeds the minimum threshold for commercial usefulness (that is, from about 5 to about 7%). Conclusions from these experiments, in combination with processing considerations, would suggest to persons of ordinary skill that further performance enhancements can be obtained for layers of higher values of r, t, and $V_f$.

Among the advantages of the moldable, neutron sensitive compositions disclosed herein include straight-forward manufacturing, easy adaptation into multiple products, and/or space/weight savings relative to conventional methods. These features, especially in combination, enable the cost-effective development of products requiring neutron detection abilities.

As used herein, the terms "a" and "an" do not denote a limitation of quantity, but rather denote the presence of at least one of the referenced item. Moreover, the endpoints of all ranges directed to the same component or property are inclusive of the endpoint and independently combinable (for example, "up to about 25 wt. %, or, more specifically, about 5 wt. % to about 20 wt. %," is inclusive of the endpoints and all intermediate values of the ranges of "about 5 wt. % to about 25 wt. %," et cetera). The modifier "about" used in connection with a quantity is inclusive of the stated value and has the meaning dictated by the context (for example, includes the degree of error associated with the measurement of the particular quantity). Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A moldable, neutron sensitive composition comprising:
   (a) an inorganic scintillating component;
   (b) a neutron capture component comprising a nuclide having a thermal neutron absorption capture cross-section of at least about 100 barns;
   (c) a gamma-ray insensitive, transmissive moldable resin composition;
   wherein said inorganic scintillating component and said neutron capture component are in intimate mixture with at least each other; and
   wherein said moldable, neutron sensitive composition is a solid or semi-solid with sufficient flowability for molding into a shaped article.

2. The moldable, neutron sensitive composition of claim 1 wherein a mass ratio of neutron capture component to inorganic scintillating component is from about 0.1 to about 10.

3. The moldable, neutron sensitive composition of claim 2 wherein the mass ratio is from about 0.2 to about 1.

4. The moldable, neutron sensitive composition of claim 1 wherein a volume fraction of the sum of volumes of inorganic scintillating component and neutron capture component to the total volume of moldable neutron sensitive composition is from about 40% to about 80%.

5. The moldable, neutron sensitive composition of claim 1 wherein the inorganic scintillating component and the neutron capture component are further in intimate mixture with said moldable resin composition.

6. The moldable, neutron sensitive composition of claim 1 wherein the neutron capture component comprises a compound of at least one element selected from the group consisting of Li, B and Gd.

7. The moldable, neutron sensitive composition of claim 6 wherein the neutron capture component comprises $^6$LiF.

8. The moldable, neutron sensitive composition of claim 1 wherein the inorganic scintillating component comprises one or more selected from the group consisting of metal oxide, metal sulfide, metal selenide, metal oxysulfide, mixed metal oxide and metal halide.

9. The moldable, neutron sensitive composition of claim 8 wherein the inorganic scintillating component comprises ZnS or (Zn,Cd)S.

10. The moldable, neutron sensitive composition of claim 9 wherein the inorganic scintillating component comprises ZnS:Ag or ZnS:Cu.

11. The moldable, neutron sensitive composition of claim 1 wherein the neutron capture component and the inorganic scintillating component are the same compound.

12. The moldable, neutron sensitive composition of claim 1 wherein the moldable resin composition comprises one or more of a thermoplastic resin or a thermoset resin.

13. The moldable, neutron sensitive composition of claim 12 wherein the moldable resin composition comprises one or more selected from acrylate-based resin, epoxy resin, siloxane resin.

14. The moldable, neutron sensitive composition of claim 1, wherein the moldable, neutron sensitive composition is capable of being shaped into an article by a shaping step selected from the group consisting of tape casting, slip casting, extrusion, pultrusion, injection molding, compression molding, blow molding, rolling, thermoforming, vacuum forming, kneading, pressing, coating, spraying, printing, and combinations thereof.

15. The moldable, neutron sensitive composition of claim 1, wherein each of the inorganic scintillating component and the neutron capture component has a mean particle size of about 0.1 microns to about 60 microns.

16. The moldable, neutron sensitive composition of claim 1 wherein said moldable, neutron sensitive composition substantially does not fluoresce under irradiation by gamma rays.

17. A shaped, neutron sensitive article, made by shaping the moldable, neutron sensitive composition of claim 1 with a shaping step selected from the group consisting of tape casting, slip casting, extrusion, pultrusion, injection molding, compression molding, blow molding, rolling, thermoforming, vacuum forming, kneading, pressing, coating, spraying, printing, and combinations thereof.

18. The shaped article of claim 17, wherein said article is in the form of an elongated layer having a thickness, wherein parameters of thickness, $V_f$, and mass ratio of neutron capture component to inorganic scintillating component of said shaped neutron sensitive article are each preselected to maximize a thermal neutron sensitivity value for the article.

19. The shaped article of claim 17, wherein said article is in the form of an elongated layer having thickness in the range of from about 300 to about 800 microns.

20. A radiation detector capable of neutron detection comprising:

a radiation sensing element comprising the shaped, neutron sensitive article of claim 17; and
a photosensor optically coupled to the shaped, neutron sensitive article for detecting emission of photons from the inorganic scintillating component of said shaped, neutron sensitive article.

21. The radiation detector of claim 20 wherein the detector is a hand-held or portable detector.

22. A moldable, neutron sensitive composition comprising:
(a) an inorganic scintillating component comprising doped ZnS;
(b) a neutron capture component comprising a $^6$Li nuclide;
(c) a gamma-ray insensitive, transmissive moldable resin composition;
wherein said inorganic scintillating component and said neutron capture component are in intimate mixture with at least each other; wherein said moldable, neutron sensitive composition is a solid or semi-solid with sufficient flowability for molding into a shaped article; wherein the mass ratio of neutron capture component to inorganic scintillating component is from about 0.2 to about 1; and wherein the volume fraction of the sum of volumes of inorganic scintillating component and neutron capture component to the total volume of moldable neutron sensitive composition is from about 40% to about 80%.

23. A method of fabricating a moldable, neutron sensitive composition, said method comprising steps:
(i) forming an intimate mixture of at least one inorganic scintillating component and at least one neutron capture component comprising a nuclide having a thermal neutron absorption capture cross-section of at least about 100 barns;
(ii) combining the intimate mixture of said at least one inorganic scintillating component and said at least one neutron capture component with a gamma ray-insensitive, transmissive moldable resin composition under conditions effective to form said moldable, neutron sensitive composition as a solid or semi-solid with sufficient flowability for molding into a shaped article.

24. The method of claim 23 further comprising performing one or more step selected from comminuting, agitating, and deagglomerating upon said at least one inorganic scintillating component and said at least one neutron capture component individually or together during or prior to the step (i) of forming said intimate mixture.

25. The method of claim 23 wherein said conditions include one or more selected from the group consisting of agitating, filtering, straining, pressing, crushing, and deagglomerating.

26. The method of claim 23, further comprising a step of shaping the moldable, neutron sensitive composition to form a shaped article.

27. The method of claim 26, wherein said step of shaping comprises a step selected from the group consisting of tape casting, slip casting, extrusion, pultrusion, injection molding, compression molding, blow molding, rolling, thermoforming, vacuum forming, kneading, pressing, coating, spraying, printing, and combinations thereof.

28. The method of claim 23, wherein the neutron capture component comprises a compound of at least one element selected from the group consisting of Li, B and Gd.

29. The method of claim 28, wherein the neutron capture component comprises a lithium compound enriched in $^6$Li.

30. The method of claim 23, wherein the inorganic scintillating component comprises one or more selected from the group consisting of metal oxide, metal sulfide, metal selenide, metal oxysulfide, mixed metal oxide and metal halide.

31. The method of claim 30, wherein the inorganic scintillating component comprises ZnS or (Zn,Cd)S.

32. The method of claim 23, wherein the moldable resin composition comprises one or more of a thermoplastic resin or a thermoset resin.

33. The method of claim 32, wherein the moldable resin composition comprises one or more selected from acrylate-based resin, epoxy resin, siloxane resin.

34. A method for forming a shaped, neutron sensitive article comprising steps:
   (i) providing a moldable, neutron sensitive composition comprising an inorganic scintillating component, a neutron capture component comprising a nuclide having a thermal neutron absorption capture cross-section of at least about 100 barns, and a gamma-ray insensitive, transmissive moldable resin composition, wherein said inorganic scintillating component and said neutron capture component are in intimate mixture with at least each other, and wherein said moldable, neutron sensitive composition is a solid or semi-solid with sufficient flowability for molding into a shaped article;
   (ii) shaping said neutron sensitive composition into a shaped neutron sensitive article by a step selected from the group consisting of tape casting, slip casting, extrusion, pultrusion, injection molding, compression molding, blow molding, rolling, thermoforming, vacuum forming, kneading, pressing, coating, spraying, printing, and combinations thereof.

35. A shaped, neutron sensitive article made by shaping a moldable, neutron sensitive composition;
   wherein the moldable, neutron sensitive composition comprises an inorganic scintillating component, a neutron capture component comprising a nuclide having a thermal neutron absorption capture cross-section of at least about 100 barns and a gamma-ray insensitive, transmissive moldable resin composition, wherein said inorganic scintillating component and said neutron capture component are in intimate mixture with at least each other, and wherein said moldable, neutron sensitive composition is a solid or semi-solid with sufficient flowability for molding into said shaped article;
   wherein parameters of thickness, $V_f$, and mass ratio of neutron capture component to inorganic scintillating component of said shaped neutron sensitive article are each preselected to yield a thermal neutron sensitivity value for the article of at least about 5.0%.

36. A radiation detector capable of neutron detection comprising:
   a radiation sensing element comprising the shaped, neutron sensitive article of claim 35; and
   a photosensor optically coupled to the shaped, neutron sensitive article for detecting emission of photons from the inorganic scintillating component of said shaped, neutron sensitive article.

* * * * *